Dec. 18, 1934.     H. W. ROTH     1,985,107
CURRENT TIME CONTROL FOR ELECTRIC WELDING MACHINES
Filed June 3, 1932
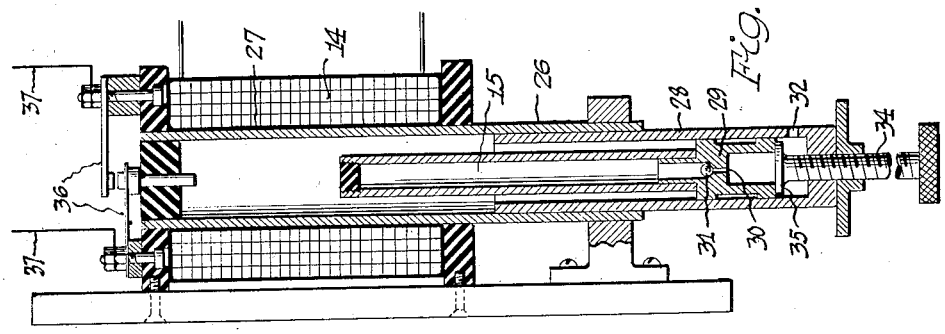
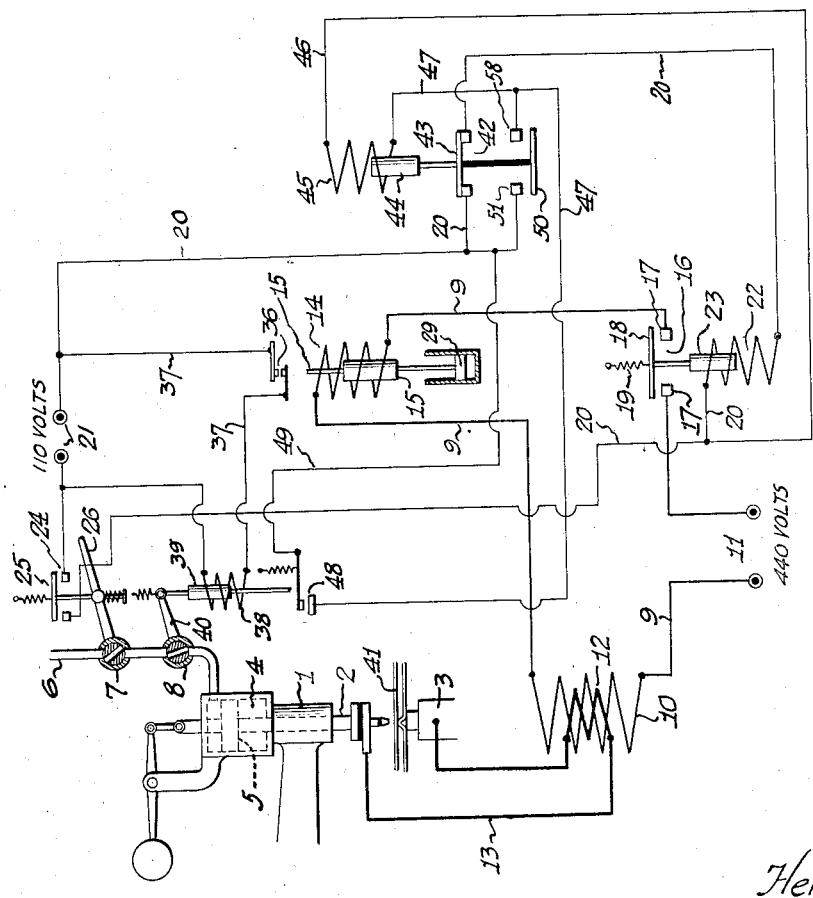
INVENTOR
Henry W. Roth,
BY
ATTORNEYS Patented Dec. 18, 1934

1,985,107

UNITED STATES PATENT OFFICE 1,985,107

CURRENT TIME CONTROL FOR ELECTRIC WELDING MACHINES

Henry W. Roth, Detroit, Mich.

Application June 3, 1932, Serial No. 615,202

5 Claims. (Cl. 219—4)

The present invention pertains to a novel control system for electric welding machines and is designed to govern the period of time during which the maximum current flows through the weld. In addition to this function, the system may also determine the moment at which the welding pressure is increased.

In electric welding, especially projection welding, the value of the current flowing through the joint is not always constant. This is due to the fact that the electrical resistance at the joint varies according to variations in the pressure applied to the stock and also to the extent to which the stock is covered with scale, grease or other foreign matter. When the foreign matter has been burned away it is desired to apply the maximum pressure to the stock and then permit the maximum current to flow through the stock for a given period of time. The device of this invention accomplishes these functions automatically through its relation with and dependence upon the current value in the welding circuit, as determined by the resistance at the joint.

The control member in the system consists of a solenoid in the main welding circuit acting upon a core which is impeded in its rate of travel. The movement of the core depends on the existence of a certain current value in the circuit, and after this current value is reached, the core requires a certain period of time in travelling to the position at which it operates a circuit breaker, a pressure increasing means or both. In the preferred embodiment of the invention illustrated herein, the core on reaching its end position first actuates a pressure increasing means which in turn actuates the circuit breaker.

The invention is fully disclosed by way of example in the following description and in the accompanying drawing, in which Figure 1 is a diagrammatic view of the apparatus, and Fig. 2 is a detail section of the control member.

Reference to these views will now be had by use of like characters which are employed to designate corresponding parts throughout.

In Fig. 1 is illustrated a portion of a welding machine comprising a head 1 in which is slidably mounted an electrode 2. Beneath the electrode 2 is a fixed electrode 3. The head is formed with a cylinder 4 through which the electrode 2 extends, and the latter carries a piston 5 working in the cylinder. Fluid under pressure, such as compressed air, may be supplied to the cylinder 4 above the piston 5 through a pipe 6, for regulating the pressure between the electrodes 2 and 3. The line 6 contains a main valve 7 which is fully opened in the operation of the device and a control valve 8 which is only partially opened at the beginning of the weld and fully opened for a comparatively short period before the completion of the weld.

The main welding circuit is shown in heavy lines and embodies a conductor 9 containing a primary winding 10 of a transformer and to which a potential 440 volts, for example, is applied at 11. The secondary winding 12 of the transformer is joined by a conductor 13 to the electrodes 2 and 3 in the usual manner. The conductor 9 contains a solenoid 14 operating on a core 15, the details and purpose of which are described below. The conductor also has a gap 16 with contacts 17 at opposite sides thereof and which may be closed by a switch member 18, although the latter is normally held in open position by a spring 19.

The switch 18 is governed by a secondary or control circuit of lower voltage. This circuit embodies the conductor indicated by the numeral 20 and is supplied with current as indicated by the numeral 21. In this conductor is mounted a solenoid 22 acting on the core 23 attached to the switch member 18 in such a manner that the latter moves to closed position on energizing of the solenoid. The circuit also contains a switch embodying a pair of spaced contacts 24 adapted to be bridged by a movable member 25. The latter is operated by a handle or pedal 26 connected to the main valve 7 so that the latter is fully opened on moving the member 25 to its circuit closing position. At this time, the switch 18 also closes, and current flows through the main welding circuit.

The coil 14 is wound on a sleeve 26 and insulated therefrom as at 27. The sleeve is extended at 28, and the core 15 which is received within the sleeve carries a piston 29 which slides in the extension 28. The fit of the piston in the extension permits a slow leakage of air around the piston, whereby movement of the core into the solenoid is impeded. A port 30 is drilled through the piston and closed by a ball valve 31 resting thereon, so that there is no flow of air through this port as the core is drawn into the coil. However, when the coil is deenergized, the core is permitted to drop unimpeded by the accompanying opening of the valve 31. Displacement of air beneath the piston is further facilitated by a port 32 in the lower end of the member 28.

Into the lower end of the member 28 is axially threaded a stop 34 having at its upper end a head 35 on which the piston 29 is adapted to rest in its lowermost position. The adjustment of the stop 34 determines the initial or rest position of the core 15 and hence the period of time required by it to reach its other end position on attraction by the solenoid 14.

A switch comprising a pair of normally spaced contacts 36 is connected in parallel with the power source 21 by conductors 37, and this switch is mounted at one end of the coil 14 to be engaged by the core 15 when drawn into the coil. In one of the conductors 37 is mounted another solenoid 38 containing a core 39 which in turn is connected to the handle 40 of the control valve 8. Thus, when the material 41 to be welded has passed a sufficient current to attract the core 15 for a given period of time determined by the impeded travel of the core until it engages and closes the contacts 36, the solenoid is energized to turn the valve 8 to its full open position, whereby the welding pressure on the electrode 2 is increased.

The conductor 20 has a gap 42 normally closed by a switch 43 carried by a core 44. The latter is surrounded by a solenoid 45 having one end joined by a conductor 46 into the conductor 20 at a point between the solenoid 22 and the spaced contacts 24. The other end of the solenoid 45 is connected by a conductor 47 to one side of a normally open switch 48 adapted to be engaged and closed by the core 39 when attracted by the solenoid 38. The other side of the switch 48 is connected by a conductor 49 to the conductor 20 at the gap 42.

The previously mentioned core 44 carries another bridge or switch member 50 parallel to the member 43 and cooperating with a pair of spaced contacts 51 which are connected respectively to the conductors 47 and 49. When the member 43 is in closed position, the member 50 is in open position, and vice versa.

The operation has already been described to the point of opening the control valve 8 after a current of given strength has been flowing in the welding circuit for a given period of time. It will also be seen that the completion of the control circuit for closing the switch 18 depends on the closing of the gap 42 by the bridge 43. On attraction of the core 39 by the solenoid 38 to open the control valve 8, the core also closes the switch 48 to complete a circuit through the solenoid 45. This circuit is comprised as follows: switch 48, conductor 47, solenoid 45, conductor 46, conductor 20 to gap 24, across the power source 21, continuing along conductors 20 and 49 to the other side of the switch 48. By completion of this circuit, the core 44 is attracted by its solenoid 45, thereby opening the gap 42 and opening the control circuit, which in turn causes deenergizing of the solenoid 22 and opening of the welding circuit at the gap 16. At the same time, the bridge 50 is attracted into engagement with the contact 51 so that current is maintained in the solenoid 45 by way of conductor 20, bridge 50, conductor 47, coil 45, conductor 46 returning to conductor 20. By this means, the gap 42 is held open until the mechanical switch 25 is opened, for otherwise the bridge 43 would fall back into contacting position across the gap 42 and thus close the welding circuit again although the weld has been completed.

It will now be seen that the application of full pressure to the electrode 2 and the closing of the welding circuit are timed by the impeded core 15. The travel of the core is also dependent on the passage of a certain amount of current through the welding circuit as determined by the conductivity at the joint to be welded. Thus, when the material 41 is of relatively poor conductivity because of foreign matter thereon, the smaller current first flowing in the welding circuit is not fully effective in moving the core 15. When the foreign matter has been burned away at the joint and the conductivity at the joint is increased, the welding circuit takes the increased current until the core 15 closes the switch 36. Thereupon the control valve 8 is opened wider for increased welding pressure, and current continues to flow in the welding circuit for the interval required for the core 39 to close the switch 48 and for the relays 42—45 and 16—19 to operate. These relays are obviously timed to permit flow of current for the proper interval after full opening of the valve 8. Likewise the impeded relay 14—15 is adjusted to commence its travel on attainment of the proper current value in the welding circuit, and the period of travel is also detrimined by the adjustable stop 34 as already described.

Although a specific embodiment of the invention has been illustrated and described it will be understood that various alterations in the details of construction may be made without departing from the scope of the invention as indicated by the appended claims.

What I claim is:

1. In an electric welding machine, a movable member adapted to effect opening of the main welding circuit on reaching a certain point in its travel, said member being operable by the current in said welding circuit and dependent, in its rate of travel, on the strength of said current, and means for adjusting the initial rest position of said member.

2. In an electric welding machine, a movable member operable by the current in the main welding circuit, and dependent, in its rate of travel, on the current strength in said circuit, and means for increasing the welding pressure, said means being operable by said member on reaching a certain point in its travel.

3. In an electric welding machine, a movable member operable by the current in the main welding circuit, and dependent, in its rate of travel, on the current strength in said circuit, means for increasing the welding pressure, said means being operable by said member on reaching a certain point in its travel, and means operable by the first mentioned means for opening the welding circuit.

4. In an electric welding machine, a solenoid in the main welding circuit, a core movable in said solenoid, means for impeding the travel of said core under the influence of said solenoid, and means for increasing the welding pressure, said means being operable by said core on reaching a given position in its travel.

5. In an electric welding machine, a solenoid in the main welding circuit, a core movable in said solenoid, means for impeding the travel of said core under the influence of said solenoid, means for increasing the welding pressure, said means being operable by said core on reaching a given position in its travel, and means including a switch operable by said core for opening the welding circuit.

HENRY W. ROTH.